April 11, 1933.     H. MUNSON     1,903,738
SILENCER AND REGULATOR
Filed Oct. 21, 1930
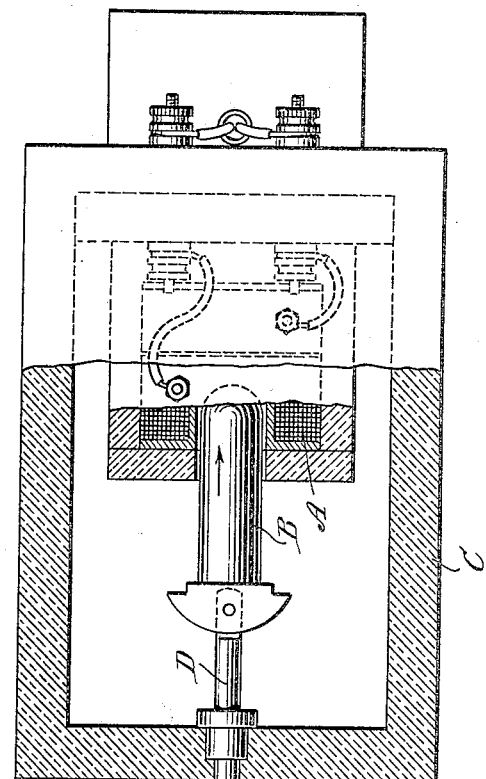
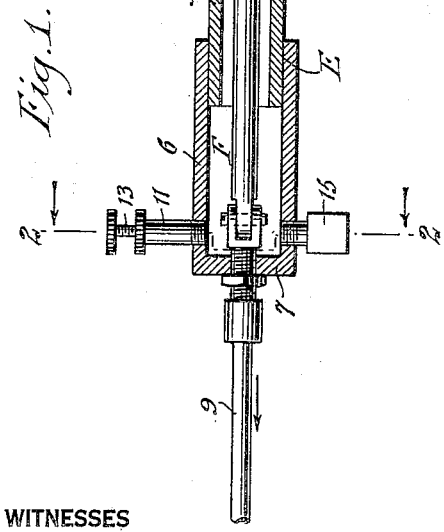
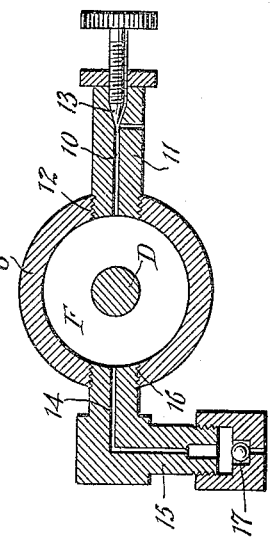
WITNESSES
INVENTORS
Harry Munson
BY
ATTORNEYS Patented Apr. 11, 1933

1,903,738

UNITED STATES PATENT OFFICE

HARRY MUNSON, OF WANTAGH, NEW YORK, ASSIGNOR TO VAN KANNEL REVOLVING DOOR COMPANY, OF NEW YORK, N. Y., A CORPORATION OF NEW JERSEY

SILENCER AND REGULATOR

Application filed October 21, 1930. Serial No. 490,307.

This invention relates generally to a controlling device for regulating and silencing the operation of quick acting mechanisms, and has particular reference to a silencer and regulator for electro-magnetically operated devices, such as solenoids, and while the invention is not necessarily restricted thereto, the same is especially designed for use in connection with a solenoid for applying a brake to a revolving door, and which forms a part of a regulating device such as disclosed in a pending application Serial No. 488,976, filed October 15, 1930.

The invention broadly aims to provide a control device for regulating a magnetically operated element or its equivalent, by virtue of which movement of the element in opposite directions may be differentially retarded or retarded in one direction and permitted to move freely in the opposite direction.

More specifically, the invention comprehends a device of the indicated character which includes a variable capacity fluid chamber having a constantly open vent for admission or exhaust of a fluid to the chamber and a valved intake port adapted to be closed by internal pressure and opened by external pressure, with a connection between the element to be controlled and the chamber varying capacity means.

Other objects of the invention reside in the provision of a controlling device for regulating and silencing the operation of electro-magnetically operated elements or the like, which device employs but few and simple parts capable of economical production, assemblage and installation and which efficiently performs its function.

With the above recited and other objects in view, reference is had to the following description and accompanying drawing, in which there is exhibited one example or embodiment of the invention, while the claims define the actual scope of the same.

In the drawing:

Figure 1 is a fragmentary sectional plan view of a controlling device applied to a solenoid for regulating and silencing the operation thereof.

Figure 2 is an enlarged transverse sectional view taken approximately on the line 2—2 of Figure 1.

Referring to the drawing by characters of reference, A designates a solenoid, B the core or armature thereof which is designed to be attracted and axially moved in the direction indicated by the arrow when the solenoid is energized, C a housing or casing for the solenoid, and D a rod or shaft which is adapted to be moved by and with the core or armature B.

The controlling device indicated generally by the reference character E may vary considerably, but for the purposes of illustration it is disclosed as composed of telescopically associated fixed and movable sections 5 and 6 of generally cylindrical form, the fixed section being attached to and carried by the casing or housing C, while the movable section 6 telescopically slides over the fixed section 5. The section 6 is provided with a closed head or outer end 7, while the section 5 is provided with a closed inner end or head 8 through which the rod or shaft D axially extends and is connected with the outer end or head 7 in any suitable manner to cause the section 6 to be moved by and with the core or armature B when the solenoid A is energized. A rod or link 9 is also connected with the outer end or head 7 of the section 6, which rod or link 9 may be operatively connected or joined to any suitable mechanism to be actuated by the solenoid, it being understood that the mechanism with which the link 9 is connected is provided with springs or other means for effecting the movement of the link and the parts connected therewith in the reverse direction indicated by the arrow. The sections 5 and 6 of the control device E define a variable capacity fluid chamber F, the capacity of which is decreased as the section 6 moves to the right in Figure 1 when the solenoid is energized and the capacity of which increases as the section 6 moves to the left in Figure 1 when the solenoid is de-energized. One of the sections, preferably the section 6 as illustrated, is provided with a constantly opened fluid vent passage 10, which preferably extends through a plug 11 threaded into a threaded aperture 12 in the section 6. In practice, the vent 10 will be regulated by a needle valve 13 which is threadedly adjustable in the plug to intersect the vent passage 10. The chamber 5 is also provided with an intake passage 14, which preferably extends through a plug 15 threaded into a threaded aperture 16 in the section 6, and which intake passage is controlled by a check valve 17 which opens inwardly and closes downwardly. The check valve obviously may be of the gravity actuated type illustrated or any equivalent type which functions to close when internal fluid pressure is developed and to open by suction or when the internal pressure is less than the pressure supplied to the intake passage 14.

In use and operation, the solenoid A is illustrated in Figure 1 as de-energized and the fluid chamber F is disclosed as being adjusted to its maximum capacity. When the solenoid is energized and the core or armature B is moved in the direction indicated by the arrow thereon, its movement is controlled, retarded and cushioned by the device E. This is accomplished due to the restricted vent passage 10 through which the internal pressure developed in the fluid chamber F flows, as the capacity of the fluid chamber is gradually reduced by the movement of the section 6 to the right. During the movement of the section 6 to the right, the downwardly closing check valve 17 closes and prevents egress of the fluid pressure through the intake passage 14. Obviously, the movement of the core or armature B is retarded and gradual, thereby avoiding the noise or slap which would occur where no means were provided to control the speed of the movement of the core or armature B. When the solenoid is de-energized and the return movement of the parts is effected through the link 9, the check valve 17 opens to admit fluid pressure to the passage 14, in addition to the entrance of fluid pressure through the vent 10. The combined intake of fluid through the vent passage 10 and intake passage 14 permits of a free and unretarded return movement of the parts, which is especially desirable where an instantaneous release is desired of the mechanism controlled by the solenoid. In some instances, however, the return movement of the parts may be retarded to some extent and, obviously, this may be controlled by the size of the intake passage 14 in any desired manner, so that the movement of the parts in opposite directions may be differentially retarded. While the device disclosed is shown as retarding the movement of the core or armature B in a predetermined direction, it is obvious that the controlling device may be constructed to function to retard the same a relatively greater degree in the opposite direction.

The control device while not restricted to such use, is especially designed to be employed in connection with a solenoid for the application of a brake to a revolving door, in which instance it is desirable to retard the closing movement of the solenoid and to silence its closing operation while permitting of an instantaneous release of the brake to the revolving door when the solenoid is de-energized.

While there has been illustrated a single and preferred embodiment of the invention, no limitation is intended to the precise structural details herein exhibited, but it is to be clearly understood that variations and modifications which properly fall within the scope of the appended claims may be resorted to when desired.

What is claimed is:

1. A device for controlling the operation of an electro-magnetically operated element to retard the movement of said element in one direction and to permit of free movement of the same in the opposite direction, said device comprising telescopically associated fixed and movable fluid chamber defining sections, a constantly opened fluid venting means communicating with said chamber and an inwardly opening, outwardly closing check valve controlled intake means communicating with said chamber and a connection between said movable section and said element, said connection extending through the fluid chamber.

2. A device connected with the core of a solenoid to control the same for retarding the movement thereof when energized and to permit free movement thereof when deenergized, said device comprising telescopically associated fixed and movable fluid chamber defining sections, a constantly opened fluid venting means communicating with said chamber and an inwardly opening, outwardly closing check valve controlled intake means communicating with said chamber and a member connected to the movable section, extending through said fixed section and connected with the solenoid core.

HARRY MUNSON.